US012688685B2

(12) United States Patent
Lim et al.

(10) Patent No.: US 12,688,685 B2
(45) Date of Patent: Jul. 21, 2026

(54) SIMULATED POWDERED MODEL GENERATION FOR NEURAL NETWORKS

(71) Applicants: Peridot Print LLC, Palo Alto, CA (US); Nanyang Technological University, Singapore (SG)

(72) Inventors: Joyce Xin Yan Lim, Singapore (SG); Quang-Cuong Pham, Singapore (SG)

(73) Assignees: PERIDOT PRINT LLC, Palo Alto, CA (US); Nanyang Technological University, Singapore (SG)

( * ) Notice: Subject to any disclaimer, the term of this patent is extended or adjusted under 35 U.S.C. 154(b) by 227 days.

(21) Appl. No.: 18/279,940

(22) PCT Filed: Mar. 3, 2021

(86) PCT No.: PCT/US2021/020691
§ 371 (c)(1),
(2) Date: Sep. 1, 2023

(87) PCT Pub. No.: WO2022/186830
PCT Pub. Date: Sep. 9, 2022

(65) Prior Publication Data
US 2024/0037925 A1     Feb. 1, 2024

(51) Int. Cl.
*G06V 10/82*         (2022.01)
*G06F 30/20*         (2020.01)
(Continued)

(52) U.S. Cl.
CPC .............. *G06V 10/82* (2022.01); *G06F 30/20* (2020.01); *G06V 20/70* (2022.01); *G06F 2113/10* (2020.01)

(58) Field of Classification Search
CPC ........ G06V 10/82; G06V 20/70; G06F 30/20; G06F 2113/10; B22F 10/14; B22F 10/28
See application file for complete search history.

(56) References Cited

U.S. PATENT DOCUMENTS

| | | | |
|---|---|---|---|
| 7,512,527 B2 | 3/2009 | Nagase | |
| 2002/0123812 A1 | 9/2002 | Jayaram et al. | |
| | (Continued) | | |

FOREIGN PATENT DOCUMENTS

| | | |
|---|---|---|
| CN | 111372755 A | 7/2020 |
| DE | 102019207575 A1 | 11/2020 |
| JP | 2020-069701 A | 5/2020 |
| WO | 2019/125970 A1 | 6/2019 |
| WO | 2019/192744 A1 | 10/2019 |

OTHER PUBLICATIONS

Buls, E., et al., "Generation of synthetic training data for object detection in piles", SPIE Proceedings, vol. 11041, Mar. 15, 2019, pp. 110411Z-1-110411Z-8.

(Continued)

*Primary Examiner* — John R Wallace
(74) *Attorney, Agent, or Firm* — Michael Dryja

(57) ABSTRACT

Examples of simulated powdered model generation for neural networks are described herein. In some examples, a set of simulated powdered models that simulate application of powder to a computer aided design (CAD) model are generated. In some examples, synthetic images of the simulated powdered models placed in a virtual environment are generated. In some examples, a neural network is trained to recognize real objects based on the synthetic images of the simulated powdered models.

19 Claims, 9 Drawing Sheets

Unpowdered Model 805

Background 838

Container 836

Synthetic Image 812

Powdered Model 808

(51) Int. Cl.
*G06V 20/70*      (2022.01)
*G06F 113/10*     (2020.01)

(56)          References Cited

U.S. PATENT DOCUMENTS

| | | | |
|---|---|---|---|
| 2007/0268288 A1 | 11/2007 | Duriez et al. | |
| 2015/0254376 A1 | 9/2015 | Pettersson | |
| 2017/0274599 A1 | 9/2017 | Kitamura et al. | |
| 2017/0345140 A1 | 11/2017 | Zhang et al. | |
| 2019/0251397 A1 | 8/2019 | Tremblay et al. | |
| 2020/0089826 A1 | 3/2020 | Liu et al. | |
| 2020/0210636 A1 | 7/2020 | Sanchez Bermudez et al. | |
| 2020/0342152 A1 | 10/2020 | Van Der Velden et al. | |
| 2021/0089003 A1 | 3/2021 | Guerrier et al. | |
| 2021/0232858 A1* | 7/2021 | Mukherjee | G06T 7/70 |
| 2022/0134435 A1* | 5/2022 | Scime | G06T 7/11 |
| | | | 264/112 |
| 2022/0318620 A1 | 10/2022 | Kapoor et al. | |

OTHER PUBLICATIONS

Lim, J., X-Y., et al., "Automated post-processing of 3D-printed parts: artificial powdering for deep classification and localisation", Virtual and Physical Prototyping, vol. 16, No. 3, May 2021, pp. 333-346.

Roberto, P., et al., "Optimized and autonomous machine learning framework for characterizing pores, particles, grains and grain boundaries in microstructural images", arxiv.org, Jan. 16, 2021, pp. 21.

Cao, L., et al., "A Review of Intelligent Monitoring and Process Control for Defects in Laser Selective Melting Additive Manufacturing", Acta Aeronautica et Astronautica Sinica, vol. 42, No. 10, Dec. 31, 2020, pp. 1-35 (English Abstract Submitted).

Wang, L., et al., "Development and Outlook of Intelligent Pavements.", Journal of China Highway and Transport, No. 4, Apr. 15, 2019, pp. 1-8 (English Abstract Submitted).

* cited by examiner

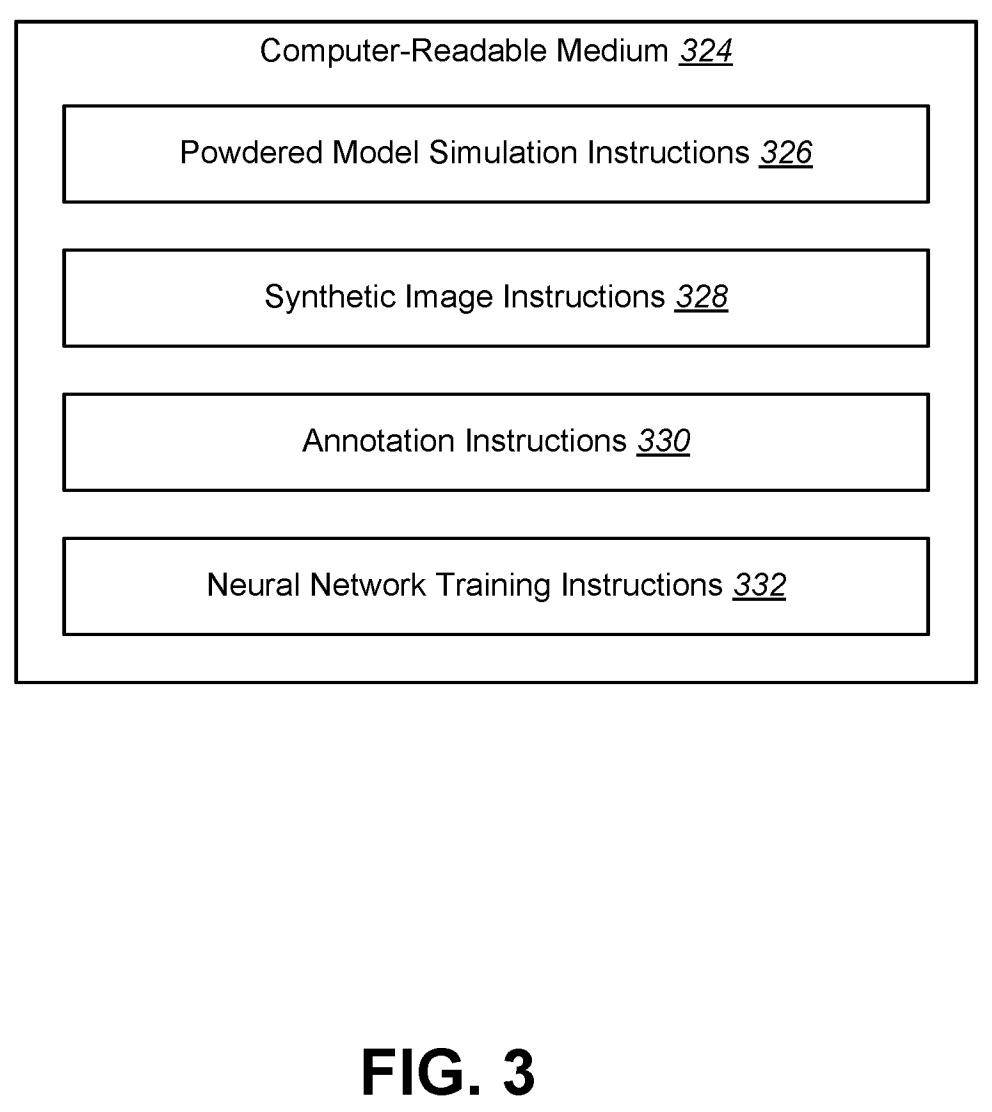

Computer-Readable Medium 324

Powdered Model Simulation Instructions 326

Synthetic Image Instructions 328

Annotation Instructions 330

Neural Network Training Instructions 332

FIG. 3

402 Generate a set of simulated powdered models that simulate application of powder to a computer aided design (CAD) model 404 Generate synthetic images of the simulated powdered models placed in a virtual environment 406 Train a neural network to recognize real objects based on the synthetic images of the simulated powdered models

400

Convex Surface 713

Concave Surface 712

Convex Hull 711

Simulated Powdered Model 708

CAD Model 705

●   Point on CAD Model 701

→   Surface Normal 703

■   New Point: Constant Expansion 706

▲   New Point: Convexity-Dependent Expansion 707

– –   New Surface 709

Container 836

Powdered Model 808

Unpowdered Model 805

Background 838

Synthetic Image 812

SIMULATED POWDERED MODEL GENERATION FOR NEURAL NETWORKS

BACKGROUND

Electronic technology has advanced to become virtually ubiquitous in society and has been used to improve many activities in society. For example, computing devices are used to perform a variety of tasks, including work activities, communication, research, and entertainment. Different varieties of electronic circuits may be utilized to provide different varieties of electronic technology.

BRIEF DESCRIPTION OF THE DRAWINGS

Various examples will be described below by referring to the following figures.

FIG. 3 is a block diagram illustrating an example of a computer-readable medium for training a neural network using simulated powdered models;

Figure 1:
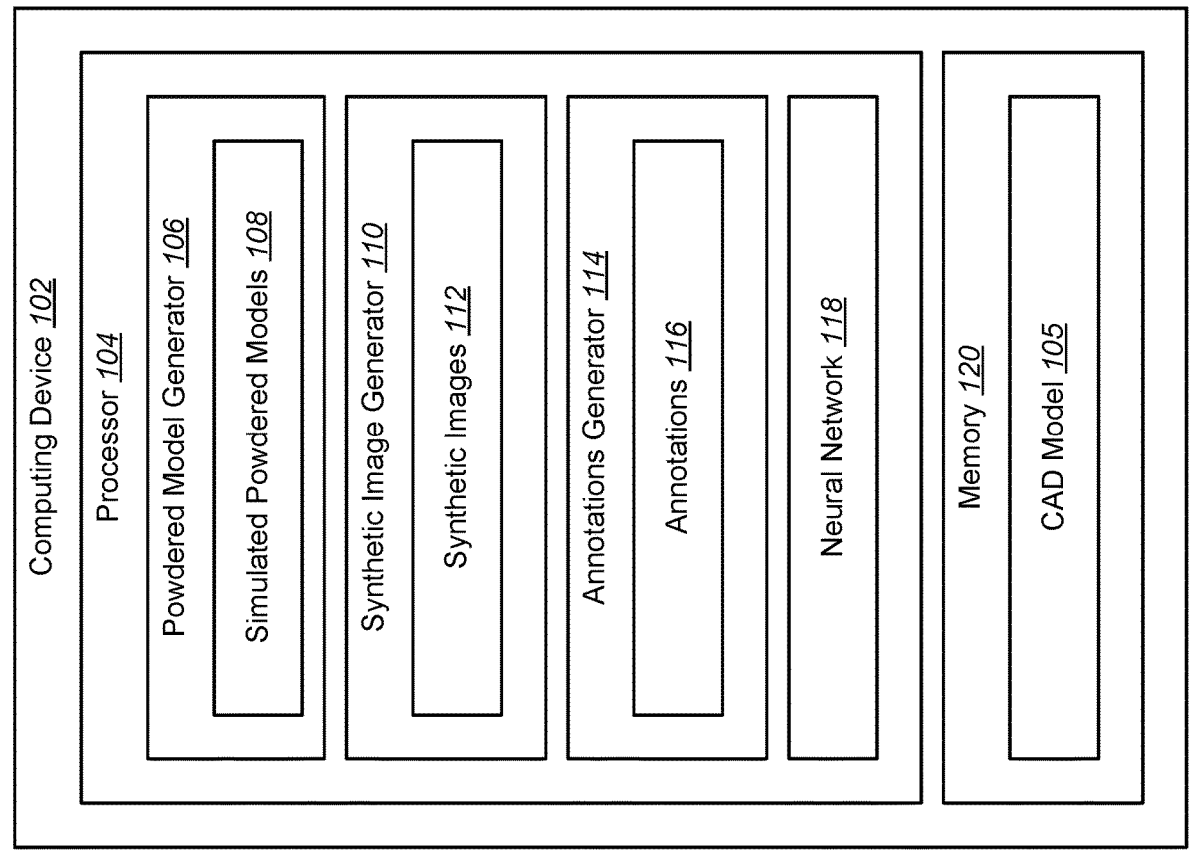
FIG. 1 is a block diagram illustrating an example of a computing device to train a neural network using simulated powdered models.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples in accordance with the description; however, the description is not limited to the examples provided in the drawings.

DETAILED DESCRIPTION

A computing device may be a device that includes electronic circuitry. For instance, a computing device may include integrated circuitry (e.g., transistors, digital logic, semiconductor technology, etc.). Examples of computing devices include servers, laptop computers, desktop computers, smartphones, tablet devices, wireless communication devices, game consoles, game controllers, smart appliances, printing devices, vehicles with electronic components, aircraft, drones, robots, smart appliances, etc.

In some examples, a computing device may perform computing operations for additive manufacturing. As used herein, additive manufacturing refers to the production of three-dimensional (3D) solid parts from a digital model. As used herein, a computer-aided design (CAD) model is a digital model used to produce a 3D solid part. In some examples, additive manufacturing may be used in rapid prototyping, mold generation, mold master generation, and short-run manufacturing. Additive manufacturing involves the application of successive layers of build material. This is unlike other machining processes that often remove material to create the final part. In some additive manufacturing techniques, the build material may be cured or fused.

Three-dimensional (3D) printing is an example of additive manufacturing. Some examples of 3D printing may include powder-based processes, such as selective laser sintering (SLS), binder jetting, and multi jet fusion (MJF).

With the rapid rise in popularity in additive manufacturing, industrial 3D printers are increasingly competitive and capable of mass production. However, post-production operations (e.g., cleaning, sorting, binning, etc.) of parts produced by additive manufacturing may not be able to cope with a rising number and variety of printed parts. Therefore the post-production operations for additive manufacturing may rely heavily on manual labor. Thus, to move towards end-to-end automated manufacturing and post-production operations, examples are described herein for a fully automated vision pipeline for classifying and locating parts produced by powder-based additive manufacturing processes.

In some examples, simulations of powder distribution on the surface of 3D printed parts may be generated. These simulated powdered models may be incorporated in a neural network training pipeline. A neural network trained on simulated powdered models may perform classification and localization of real parts rather than using real images to train the neural network. The simulated powdered models may result in superior part recognition as compared to using the original, unpowdered CAD models, especially for manufactured parts that appear significantly different from their CAD models due to powder accumulation.

FIG. 1 is a block diagram illustrating an example of a computing device 102 to train a neural network 118 using simulated powdered models 108. Examples of the computing device 102 may include additive manufacturing devices (e.g., powder-based 3D printers), servers, workstations, laptop computers, desktop computers, tablet devices, cellular phones, smartphones, wireless communication devices, gaming consoles, gaming controllers, smart appliances, printing devices, vehicles (e.g., automobiles) with electronic components, aircraft, drones, robots, smart appliances, etc.

In some examples, the computing device 102 may include a processor 104. The processor 104 may be any of a microcontroller (e.g., embedded controller), a central processing unit (CPU), a semiconductor-based microprocessor, graphics processing unit (GPU), field-programmable gate array (FPGA), an application-specific integrated circuit (ASIC), a circuit, a chipset, and/or other hardware device suitable for retrieval and execution of instructions stored in a memory 120. The processor 104 may fetch, decode, and/or execute instructions stored in memory 120. While a single processor 104 is shown in FIG. 1, in other examples, the processor 104 may include multiple processors (e.g., a CPU and a GPU).

The memory 120 of the computing device 102 may be any electronic, magnetic, optical, and/or other physical storage device that contains or stores electronic information (e.g., instructions and/or data). The memory 120 may be, for example, Random Access Memory (RAM), Electrically Erasable Programmable Read-Only Memory (EEPROM), Dynamic Random Access Memory (DRAM), Synchronous DRAM (SDRAM), magnetoresistive random-access memory (MRAM), phase change RAM (PCRAM), non-volatile random-access memory (NVRAM), memristor, flash memory, a storage device, and/or an optical disc, etc. In some examples, the memory 120 may be a non-transitory tangible computer-readable storage medium, where the term "non-transitory" does not encompass transitory propagating signals. The processor 104 may be in electronic communication with the memory 120. In some examples, a processor 104 and/or memory 120 of the computing device 102 may be combined with or separate from a processor (e.g., CPU) and/or memory of a host device.

In some examples, the computing device 102 may be used for additive manufacturing operations. For instance, the computing device 102 may be an additive manufacturing device (e.g., powder-based 3D printer). In other examples, the computing device 102 may be a computer (e.g., server, desktop computer, laptop computer, etc.) that is separate from an additive manufacturing device.

Additive manufacturing has become increasingly popular in recent years attributed to its ability to mass manufacture unique parts. In some examples, additive manufacturing may form 3D objects through different approaches, such as, solid-based printing, powder-based printing, and/or liquid-based printing. In powder-based 3D printing processes, both metal powder and plastic powder may be used to print parts. These powder-based 3D printing processes may include selective laser sintering (SLS), binder jetting, and/or multi jet fusion (MJF).

In some examples, post-production operations may be performed on printed parts produced through additive manufacturing. As used herein, a post-production operation may be an action performed on a single part or multiple parts after printing. Post-production operations may be performed to improve quality. In some examples, a post-production operation may include, sorting, binning, cleaning of residue powder or support material, surface finishing, and/or painting a printed part. Post-production operations may result in longer total production times.

Manual post-production operations may be costly and tedious. For example, the total cost to produce a part may be significantly increased due to costs related to post-production operations. These costs may include part breakage cost, human labor costs, etc.

Automated post-production operations may reduce production costs. In one example, automated decaking, or cleaning of residue powder, may use a tumbler and induce vibrations to release trapped powder. This tumbler example may also be extended to surface finishing. In some examples, post-production operations may include automated support removal, a platform to automate post-production order, automatic generation of post-production machining paths, and/or automated approaches to improve the surface quality of a printed part.

In some examples, printed parts may be subjected to more than one post-production operation. However, commercial equipment to perform these post-production operations may be costly. In addition, plastic parts and metal parts may use different machines for post-production operations to avoid contamination. Hence, to enhance end-to-end automated post-production operations, the examples described herein provide for a fully automated vision pipeline for powder-based 3D printed parts.

In some examples, given the CAD model 105 of the parts, a neural network 118 may be trained to classify and localize (e.g., locate in a physical space) powdered parts with high precision and recall. For example, by accurately detecting powdered parts, more end-to-end automated post-production tasks would be feasible, such as using a robot arm to sort printed parts after coarse decaking (e.g., after extracting parts from a powder bed of the 3D printer). In addition, the examples described herein may be applied to different powder-bed fusion technologies as the parts printed from SLS, binder jetting and MJF may be similar in appearances. For instance, these parts may be largely covered with powder after printing.

Due to the diversity of 3D printed parts, it may not be practical to collect real-world data for training of neural networks. For example, collecting multiple images of real parts in various orientations may be extremely tedious and time consuming. To increase the accessibility of data, simulation is a viable option to obtain synthetic training data. In addition, printed parts may not resemble their CAD models due to the amount of powder on them, which varies based on their geometry. Also, every powdered part is unique as the amount of residue powder is different for a specific part.

In some examples, the neural network 118 may be trained using simulated training data. Artificial powder on a CAD model 105 may be simulated to obtain several unique simulated powdered models 108 per part. The CAD models 105 and their respective simulated powdered models 108 may be fed into a physics simulator to render synthetic images 112 with the simulated powdered models 108 and unpowdered CAD models 105 positioned in a virtual environment. Annotations 116 (e.g., object masks) may be automatically generated for every synthetic image 112 to be used for neural network training. The neural network 118 may be trained with the synthetic images 112 and the annotations 116. Examples of this process are described below.

Because of powder on the printed parts, the shapes of the printed parts may be visually different from their corresponding CAD models 105. This visual difference may affect neural network performance in recognizing real parts. Therefore, a set of simulated powdered models 108 may be generated to resemble the real powdered parts. An example of a vision pipeline for generating synthetic images 112 from the simulated powdered models 108 for training a neural network 118 is described in FIG. 2.

Figure 2:
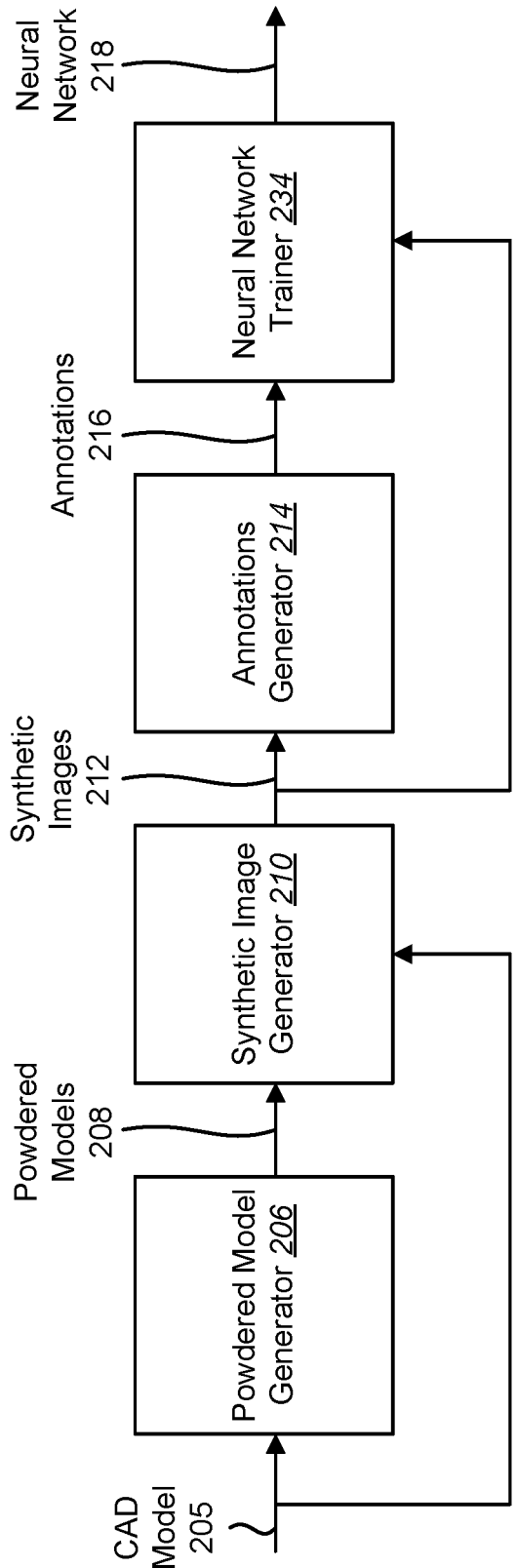
FIG. 2 is an example of a vision pipeline for generating synthetic images from simulated powdered models for training a neural network.

Referring momentarily to FIG. 2, a CAD model 205 may be fed into a powdered model generator 206 to simulate artificial powder applied or adhered to the CAD model 205. The powdered model generator 206 may output simulated powdered models 208. These simulated powdered models 208 and their original unpowdered CAD models 205 may be provided to a synthetic image generator 210. As used herein, an unpowdered model is the original CAD model 205 without the simulated application of additional powder.

In some examples, the synthetic image generator 210 may simulate the physics of the simulated powdered models 208 and the original unpowdered CAD models 205 falling into a virtual environment (e.g., a container, bin, floor, table, surface, etc.) from the output (e.g., bed) of a 3D printing device. The simulated placement of the simulated powdered models 208 and the original unpowdered CAD models 205 may be used to generate synthetic images 212. The synthetic images 212 may be fed to an annotations generator 214 to obtain annotations 216 (e.g., mask annotations). Finally, the synthetic images 212 and the annotations 216 may be provided to a neural network trainer 234 to train a neural network 218.

Referring again to FIG. 1, the processor 104 may implement a powdered model generator 106 to generate a set of simulated powdered models 108 that simulate application of powder to a CAD model 105. The set of simulated powdered models 108 may simulate the visual appearance of real parts encapsulated by powder residue during an additive manufacturing process.

In some examples, the CAD model 105 may be stored in memory 120 of the computing device 102. For example, the CAD model 105 may be stored as a file (e.g., STL file) in memory 120. In some examples, the CAD model 105 may include information to describe surface geometry of a part that is to be printed.

Artificial powder may be simulated on the CAD models 105 to improve detection performances of the neural network 118. The simulated powdered models 108 may look visually similar to real powdered parts produced by a 3D printer.

In some examples, generating the set of simulated powdered models 108 may include extending vertices of the CAD model 105 to simulate the powder adhered to a part during an additive manufacturing process. This approach may be referred to as naïve powder generation. In some examples, the naive powder generation approach may include the random extension of the vertices of the CAD model 105 along their normal (e.g., surface normals). An example of this approach is described in FIG. 6.

In some examples, generating the set of simulated powdered models 108 may include generating simulated powdered models 108 with different amounts of powder applied to outer surfaces of the simulated powdered models 108. For example, powder may be simulated that accumulates more on concave surfaces than on convex surfaces of the CAD model 105. The naive powder generation approach treats concave and convex surfaces similarly. Yet, in the case of real parts, powder tends to accumulate more in concave regions. Based on this observation, an enhanced powder generation approach may be used to add powder differently to a CAD model 105 based on the local convexity and/or concavity of a surface. An example of this approach is described in FIG. 7.

The enhanced powder generation approach may produce simulated powdered models 108 that are more visually similar to the real, powdered parts than the naive powder generation approach, especially in concave regions. However, either approach produces more accurate results for training the neural network 118 than using the unpowdered CAD model 105 alone.

In some examples, the powdered model generator 106 may generate multiple simulated powdered models 108 of varying amounts of powder for each CAD model 105. For example, some simulated powdered models 108 may be encapsulated with more or less powder than other simulated powdered models 108. This may simulate different visual appearances for real powdered parts that may have different amounts of powder after being printed.

In some examples, the powdered model generator 106 may generate a set of simulated powdered models 108 from a single CAD model 105. In this case, the set of simulated powdered models 108 may be used for single-class object detection. For example, the neural network 118 may be trained to detect a single type of part produced from a single CAD model 105.

In some examples, the powdered model generator 106 may generate a set of simulated powdered models 108 from multiple CAD models 105. In this case, the set of simulated powdered models 108 may be used for multiple-class object detection. For example, the neural network 118 may be trained to detect a multiple types of parts produced from multiple CAD models 105. For example, if a 3D printing device is to print different parts in a single printing operation, then each part may have a corresponding CAD model 105. The powdered model generator 106 may generate a first set of simulated powdered models 108 for a first CAD model 105, as described above. The powdered model generator 106 may generate a second set of simulated powdered models 108 for a second CAD model 105, and so forth.

The processor 104 may implement a synthetic image generator 110 to generate synthetic images 112 of the simulated powdered models 108 placed in a virtual environment. In some examples, the synthetic images 112 may also include unpowdered models (e.g., the original CAD model 105) placed in the virtual environment.

In some examples, the synthetic image generator 110 may generate multiple synthetic images 112 to simulate different arrangements of the simulated powdered models 108 and/or unpowered models in the virtual environment. In other examples, the synthetic image generator 110 may generate multiple synthetic images 112 to simulate different quantities of the simulated powdered models 108 and/or unpowdered models in the virtual environment.

In some examples, the synthetic image generator 110 may simulate the simulated powdered models 108 falling into or onto a surface (e.g., a container, bin, box, table, etc.). The synthetic image generator 110 may also include unpowdered models when simulating the simulated powdered models 108 falling into or onto a surface. In some examples, a bin-picking task may be performed as part of a post-production cleaning operation of real parts. To simulate this environment, the simulated powdered models 108 and/or unpowdered models may be simulated falling into an enclosed environment (e.g., container, box, bin, etc.).

In some examples, the synthetic image generator 110 may use a physics engine to simulate the placement of the simulated powdered models 108 and/or unpowdered models in a virtual environment. Examples of the physics engine may include Bullet or PyBullet. The physics engine may simulate the simulated powdered models 108 and/or unpowdered models falling into a bin due to gravity.

To induce sufficient variability, the synthetic image generator 110 may randomly adjust different parameters. For example, the synthetic image generator 110 may adjust the color, size and/or orientation of the container. In some examples, the synthetic image generator 110 may adjust the position and/or orientation of the virtual camera. In some examples, the synthetic image generator 110 may adjust the number of objects (e.g., simulated powdered models 108 and/or unpowdered models) per synthetic image 112. The synthetic image generator 110 may also adjust the simulated powdered models 108 and/or unpowdered models above the container.

Based on the selected parameters, the synthetic image generator 110 may render images with the simulated powdered models 108 and/or unpowdered models in the container. For example, the synthetic image generator 110 may generate an image of the simulated powdered models 108 and/or unpowdered models in the container. In some examples, the rendered image may be the synthetic image 112 used to train the neural network 118.

In other examples, the synthetic image generator 110 may stitch backgrounds to the rendered images to produce the synthetic images 112. For example, placing a rendered image of the simulated powdered models 108 and/or unpowdered models in the virtual container in a random setting may enhance the ability of the neural network 118 to detect real parts in different settings and/or from different perspectives. In some examples, a background image may be stitched with the rendered image of the container in the foreground. In some examples, the background may be selected (e.g., randomly selected) from an image dataset. In this case, the synthetic images 112 may be rendered by capturing an image of the container after the fallen objects had settled, and the foreground (e.g., the container) was stitched onto a random background image.

In some examples, the processor 104 may determine the locations of the simulated powdered models 108 and/or the unpowdered models in the synthetic images 112. For example, as the synthetic image generator 110 simulates the placement of the simulated powdered models 108 and unpowdered models placed in the virtual environment, the processor 104 may keep track of the final location of each object (e.g., the simulated powdered models 108 and/or the unpowdered models) in the synthetic images 112. The processor 104 may store the location and identifying information for each of the simulated powdered models 108 and/or the unpowdered models in the synthetic images 112. In some examples, the identifying information may include a unique ID for a simulated powdered model 108 or unpowdered model. In some examples, the identifying information may include a type of model in the case where a synthetic image 112 includes different CAD models 105.

The processor 104 may implement an annotations generator 114 to generate annotations 116 for the synthetic images 112. For example, the annotations 116 may identify individual simulated powdered models 108 in the synthetic images 112.

By using a physics simulator for the creation of the synthetic images 112, the locations of the objects (e.g., the simulated powdered models 108 and/or the unpowdered models) in the image may be known. With this information, the annotations 116 may be obtained that can be used to train a neural network 118 to detect real parts. Therefore, the annotations generator 114 may generate the annotations 116 for the synthetic images 112 based on the locations of the simulated powdered models 108 and/or unpowdered models in a given synthetic image 112.

In some examples, the annotations generator 114 may generate mask annotations for each simulated powdered model 108 and/or unpowdered model in the synthetic images 112. As used herein, a mask annotation is a contour of a given object (e.g., a simulated powdered model 108 or unpowdered model) in an image (e.g., a synthetic image 112). In some examples, a mask annotation may be the contour (e.g., polygon) of an object (e.g., a simulated powdered model 108 or unpowdered model) that was generated and placed in a synthetic image 112.

In some examples, a gray-thresholding method may be used to generate the mask annotations. For example, the color of a selected object (e.g., a simulated powdered model 108 or unpowdered model) in a given synthetic image 112 may be changed to a first color (e.g., white). The remainder of the given synthetic image 112 (e.g., the other simulated powdered models 108, unpowdered models, container, and/or background) may be changed to a second color (e.g., black). A snapshot of the container may be captured using the same camera parameters as were used to create the given synthetic image 112. Gray-thresholding may be used to obtain the contour (e.g., a surrounding polygon) of the selected object that is the foreground. The contour and a label (e.g., class label or model type) for the selected object (e.g., the single simulated powdered model 108 or unpowdered model) may be associated with the given synthetic image 112. This process may be repeated for the remaining objects in the given synthetic image 112 until mask annotations and labels are obtained for each of the simulated powdered models 108 and/or the unpowdered models in the given synthetic image 112. The mask annotations (e.g., contours) and labels may be saved as a file (e.g., a JSON file) that is used to train the neural network 118.

The processor 104 may train the neural network 118 to recognize real objects based on the synthetic images 112 and the annotations 116. For example, the synthetic images 112 and the annotations 116 may be fed to the neural network 118 using transfer learning. In some examples, the real objects may be parts produced during an additive manufacturing process.

In some examples, transfer learning may include training a neural network 118 for one task and using the first training as a starting point for a second task. In some examples, the neural network 118 may be a pre-trained network for transfer learning. The classifier layer of the neural network 118 may be re-trained to detect powdered real objects using the simulated powdered models 108. The neural network 118 may be trained first on a large-scale dataset for object detection and segmentation. An example of this dataset is COCO. By applying transfer learning, the neural network 118 may then be trained with a smaller dataset (e.g., the simulated powdered models 108) while achieving accurate object recognition.

Examples of the neural network 118 include convolutional neural networks (CNNs) (e.g., basic CNN, R-CNN, Mask R-CNN, inception model, residual neural network, etc.) and recurrent neural networks (RNNs) (e.g., basic RNN, multi-layer RNN, bi-directional RNN, fused RNN, clockwork RNN, etc.). Some approaches may utilize a variant or variants of RNN (e.g., Long Short Term Memory Unit (LSTM), peephole LSTM, no input gate (NIG), no forget gate (NFG), no output gate (NOG), no input activation function (NIAF), no output activation function (NOAF), no peepholes (NP), coupled input and forget gate (CIFG), full gate recurrence (FGR), gated recurrent unit (GRU), etc.). Different depths (e.g., layers) of a neural network 118 or multiple neural networks may be utilized in accordance with some examples of the techniques described herein.

In some examples, generation of the synthetic images 112 and training of the neural network 118 may occur during manufacturing of the real objects using the CAD models 105. For example, an additive manufacturing process may take a period of time (e.g., hours) to complete. During the time that the additive manufacturing process is running, the processor 104 may simulate the powdered models 108, generate the synthetic images 112 and annotations 116, and train the neural network 118 to detect the parts produced by the additive manufacturing process. In other examples, generation of the synthetic images 112 and training of the neural network 118 may occur before or after the additive manufacturing process.

FIG. 3 is a block diagram illustrating an example of a computer-readable medium 324 for training a neural network using simulated powdered models. The computer-readable medium 324 may be a non-transitory, tangible computer-readable medium 324. The computer-readable medium 324 may be, for example, RAM, EEPROM, a storage device, an optical disc, and the like. In some examples, the computer-readable medium 324 may be volatile and/or non-volatile memory, such as DRAM, EEPROM, MRAM, PCRAM, memristor, flash memory, and the like. In some examples, the computer-readable medium 324 described in FIG. 3 may be an example of memory for a computing device described herein. In some examples, code (e.g., data and/or executable code or instructions) of the computer-readable medium 324 may be transferred and/or loaded to memory or memories of the computing device.

The computer-readable medium 324 may include code (e.g., data and/or executable code or instructions). For example, the computer-readable medium 324 may include powdered model simulation instructions 326, synthetic image instructions 328, annotation instructions 330, and neural network training instructions 332.

In some examples, the powdered model simulation instructions 326 may be instructions that when executed cause the processor of the computing device to generate simulated powdered models that simulate application of powder to multiple computer aided design (CAD) models. For example, the processor may generate a first set of simulated powdered models for a first CAD model, a second set of simulated powdered models for a second CAD model, and so forth. In some examples, this may be accomplished as described in FIG. 1.

In some examples, the synthetic image instructions 328 may be instructions that when executed cause the processor of the computing device to generate synthetic images of the simulated powdered models and unpowdered models placed in a virtual environment. In some examples, this may be accomplished as described in FIG. 1.

In some examples, the annotation instructions 330 may be instructions that when executed cause the processor of the computing device to generate annotations to identify individual simulated powdered models and unpowdered models in the synthetic images. In some examples, the annotations for the synthetic images may be automatically generated based on locations of the simulated powdered models and the unpowdered models in the synthetic images. In some examples, this may be accomplished as described in FIG. 1.

In some examples, the neural network training instructions 332 may be instructions that when executed cause the processor of the computing device to train a neural network to recognize real objects based on the synthetic images and the annotations for the synthetic images. In some examples, this may be accomplished as described in FIG. 1.

Figure 4:
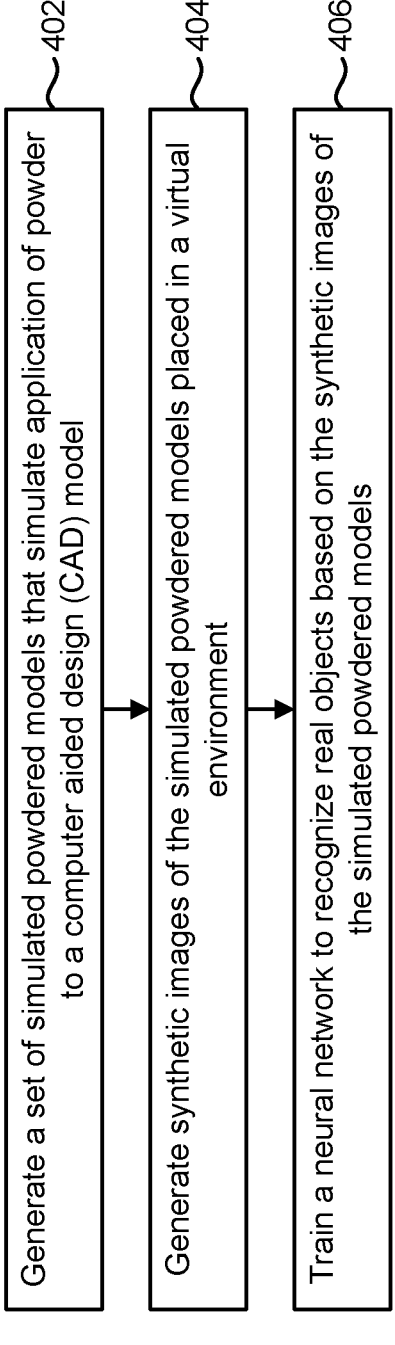
FIG. 4 is a flow diagram illustrating an example of a method for training a neural network using simulated powdered models.

FIG. 4 is a flow diagram illustrating an example of a method 400 for training a neural network using simulated powdered models. The method 400 and/or an element or elements of the method 400 may be performed by a computing device. For example, an element or elements of the method 400 may be performed by the computing device 102 described in FIG. 1 and/or the processor 104 described in FIG. 1 any of which may be referred to generally as a "computing device" in FIG. 4.

At 402, the computing device may generate a set of simulated powdered models that simulate application of powder to a CAD model. For example, the set of simulated powdered models may simulate a visual appearance of real objects encapsulated by powder residue during an additive manufacturing process. In some examples, the computing device may generate a powdered model by extending vertices of the CAD model to simulate the powder adhered to a part during an additive manufacturing process. In some examples, the computing device may generate simulated powdered models with different amounts of powder applied to outer surfaces of the simulated powdered models. In some examples, the computing device may simulate powder that accumulates more on concave surfaces than on convex surfaces of the CAD model.

At 404, the computing device may generate synthetic images of the simulated powdered models placed in a virtual environment. For example, the computing device may simulate placement of the simulated powdered models in an enclosed environment. The computing device may also simulate placing unpowdered models with the simulated powdered models in the virtual environment.

In some examples, generating the synthetic images may include simulating the simulated powdered models falling into a container. The computing device may render images with the simulated powdered models in the container. The computing device may then stitch backgrounds to the rendered images to produce the synthetic images.

In some examples, the computing device may generate annotations to identify individual simulated powdered models and/or unpowdered models in the synthetic images. For example, the computing device may generate mask annotations for each simulated powdered model and/or unpowdered model in the synthetic images.

At 406, the computing device may train a neural network to recognize real objects based on the synthetic images of the simulated powdered models. For example, the synthetic images and the annotations to the synthetic images may be used to train the neural network to recognize real objects produced during an additive manufacturing process.

Figure 5:
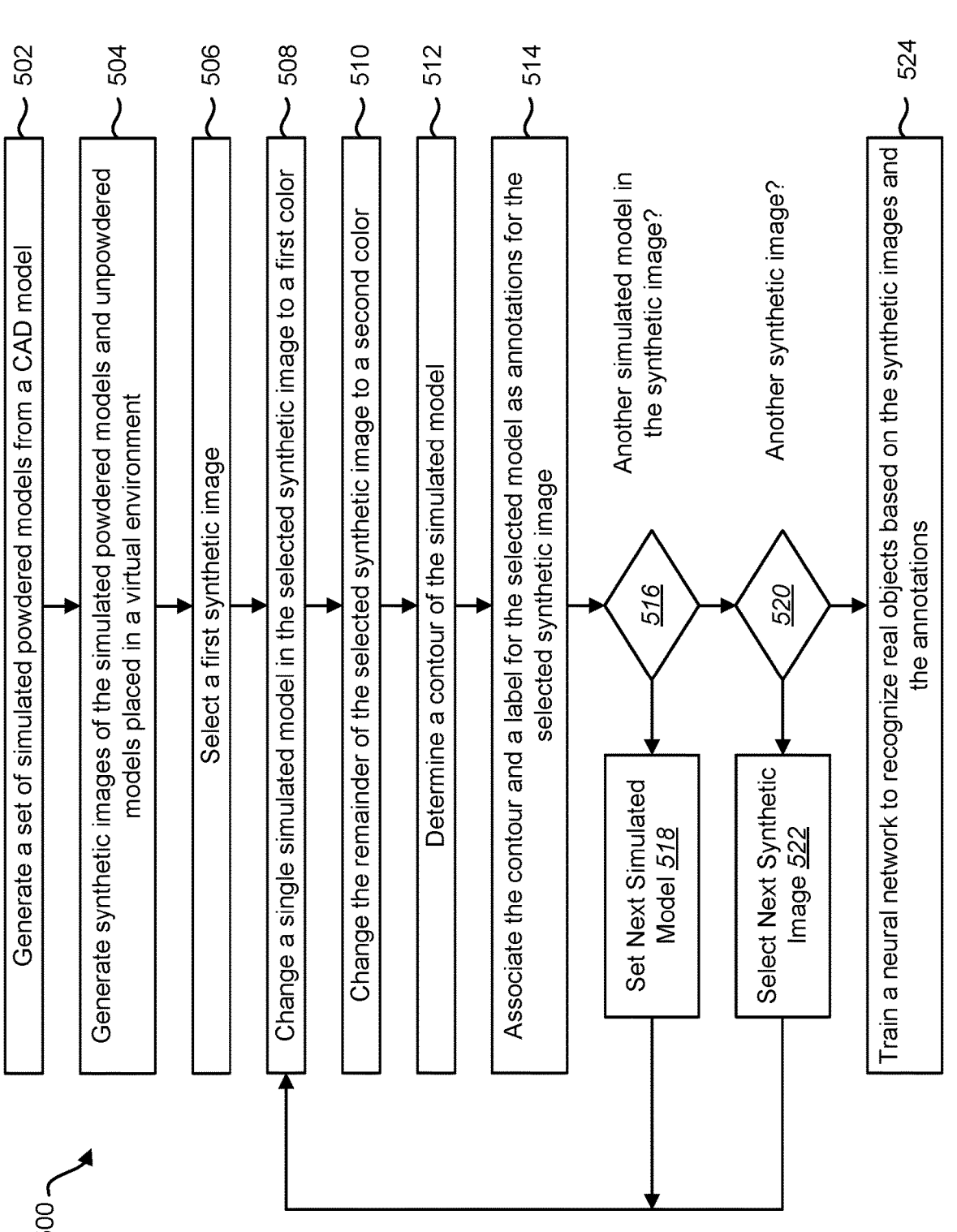
FIG. 5 is a flow diagram illustrating another example of a method for training a neural network using simulated powdered models.

FIG. 5 is a flow diagram illustrating another example of a method 500 for training a neural network using simulated powdered models. The method 500 and/or an element or elements of the method 500 may be performed by a computing device. For example, an element or elements of the method 500 may be performed by the computing device 102 described in FIG. 1 and/or the processor 104 described in FIG. 1 any of which may be referred to generally as a "computing device" in FIG. 5.

At 502, the computing device may generate a set of simulated powdered models from a CAD model. This may be accomplished as described in FIG. 1.

At 504, the computing device may generate synthetic images of the simulated powdered models and unpowdered models placed in a virtual environment. For example, the computing device may to simulate placement of the simulated powdered models and unpowdered models (e.g., copies of the CAD model) in an enclosed environment (e.g., a container).

At 506, the computing device may select a first synthetic image. For example, the computing device may select one of the multiple synthetic images that are generated.

At 508, the computing device may change a single simulated model (e.g., a powdered model or unpowdered model) in the synthetic image to a first color (e.g., white). At 510, the computing device may change the remainder of the selected synthetic image to a second color (e.g., black). At 512, the computing device may determine a contour (e.g., a surrounding polygon) of the simulated model. At 514, the computing device may associate the contour and a label for the simulated model as annotations for the selected synthetic image.

At 516, the computing device may determine whether there is another simulated model in the synthetic image that is to be processed for annotations. If there are additional simulated models (e.g., powdered models and/or unpowdered models) that do not have annotations, then at 518, the computing device may select the next simulated model. At 508, the computing device may then process the selected simulated model to generate annotations.

When the computing device determines, at 516 that there are no other simulated models in the synthetic image that need annotations, then the computing device may determine, at 520 whether there is another synthetic image that is to be processed for annotations. If there are additional synthetic images, then the computing device may, at 522, select the next synthetic image. The computing device may, at 508, process a selected simulated model to generate annotations. The computing device may continue to generate annotations for the synthetic images until the computing device determines, at 520, that there are no additional synthetic images.

At 524, the computing device may train a neural network to recognize real objects based on the synthetic images and the annotations. This may be accomplished as described in FIG. 1.

Figure 6:
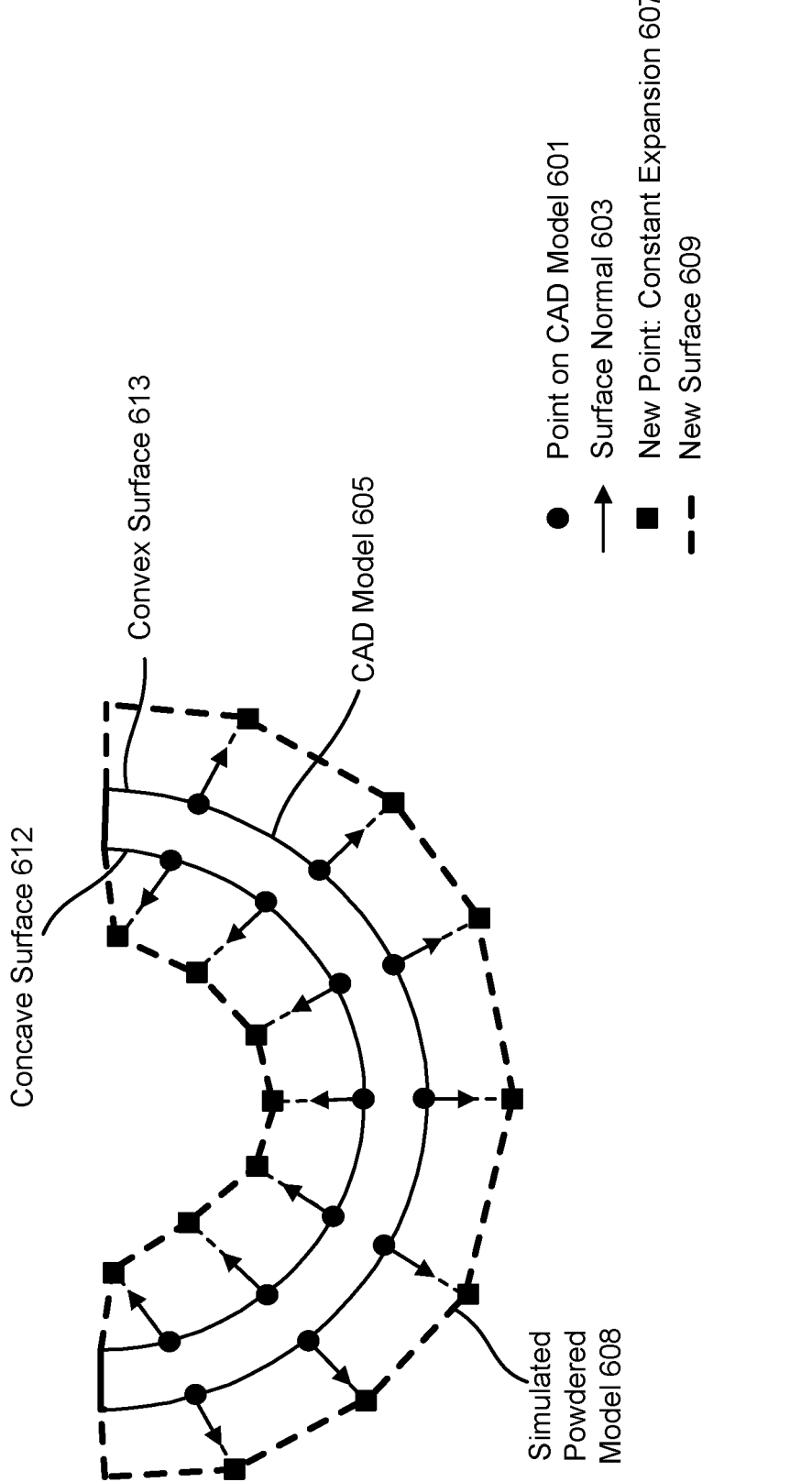
FIG. 6 is an example illustrating simulated powdered model generation.

FIG. 6 is an example illustrating simulated powdered model generation. In this example, a simulated powdered model 608 may be generated by extending vertices (e.g., points 601) on the CAD model 605 to simulate the powder adhered to a part during an additive manufacturing process. This approach may be referred to as naïve powder generation.

The naive powder generation method may include the random extension of points 601 of the CAD model 605 along their surface normal 603. In some examples, the CAD model 605 (e.g., an STL file) may be discretized into a point cloud. In some examples, this may be accomplished by using Poisson disk sampling. Points 601 may be distributed to create artificial powder on these points 601.

The average dimension (D) may be calculated by summing the length, height and width of the object bounding box of the CAD model 605. A dimension range of values may be set to randomly pick from. This dimension range of values may be based on a defined (e.g., user-defined) powder percentage (p) that has a value from [0-1]. The upper limit may be set as p<D, while the lower limit may have a higher value between 0 millimeters (mm) and (p*D−5) mm. This may be done to prevent negative values.

A random value may be picked between the dimension range for every point 601. The new point 607 may be the extended along the surface normal 603 by this value.

In some examples, a triangular mesh may be reconstructed from the point cloud of new extended points 607. In some examples, the triangular mesh may be generated by using the Poisson surface reconstruction method to obtain the new surface 609 of the simulated powdered model 608.

Figure 7:
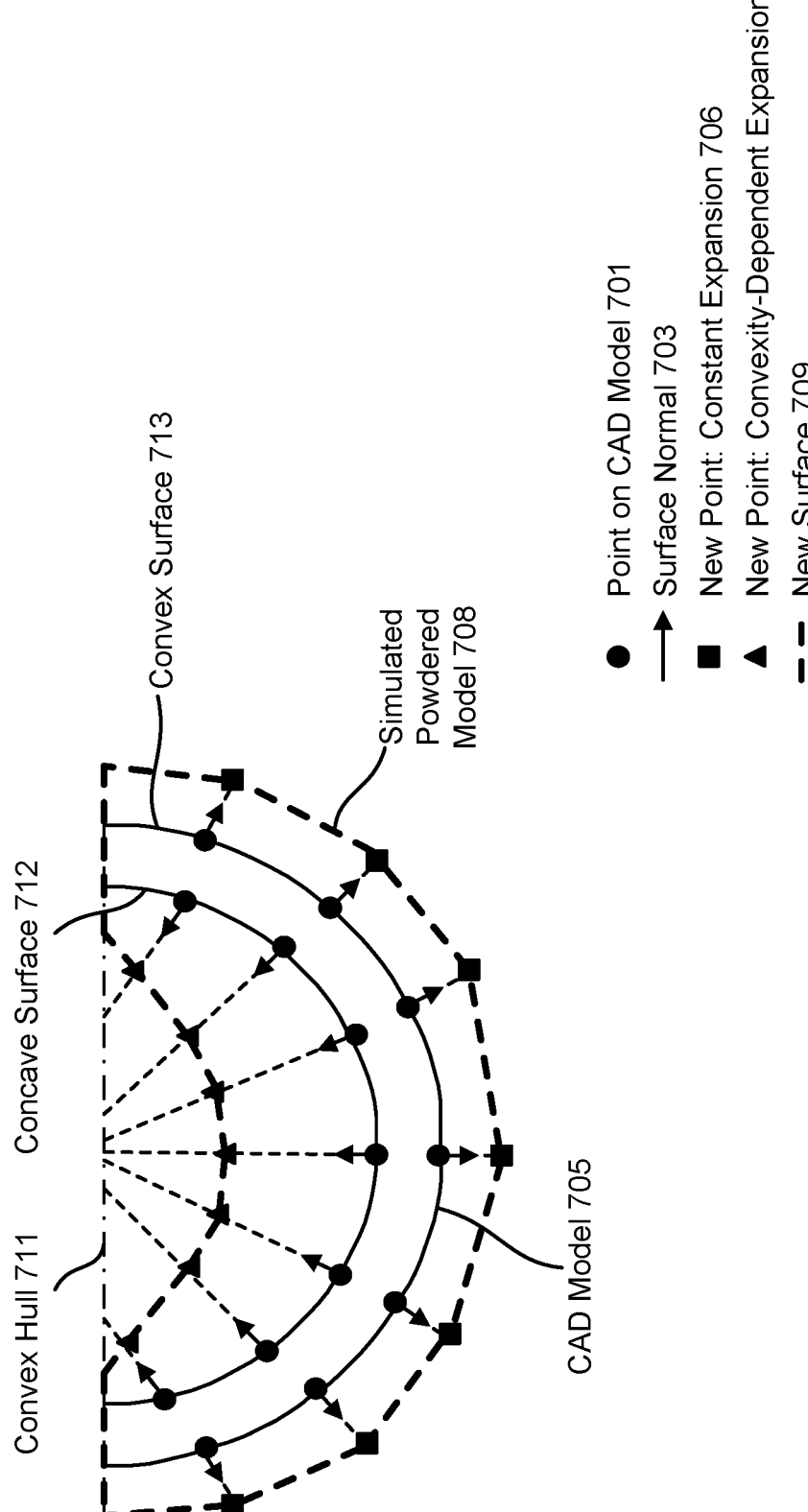
FIG. 7 is another example illustrating simulated powdered model generation.

FIG. 7 is another example illustrating simulated powdered model generation. In this example, a simulated powdered model 708 may simulate different amounts of powder applied to outer surfaces of the simulated powdered models. This approach may be referred to as enhanced powder generation that adds powder differentially, depending on the local convexity of the surface, as characterized by the convex hull 711 of the object (e.g., the CAD model 705).

In some examples, the CAD model 705 (e.g., an STL file) may be discretized into a point cloud. In some examples, this may be accomplished by using Poisson disk sampling. Points 701 may be distributed to create artificial powder on these points 701.

The convex hull 711 of the CAD model 705 may be obtained. The convex hull 711 may provide global information on the geometry of the CAD model 705, including the concave and convex areas. In some examples, the convex hull 711 may be obtained using code (e.g., libraries) that is capable of processing CAD models (e.g., trimesh or open3d libraries for STL or OBJ extensions of the CAD model). This code may return the convex hull 711 in triangular mesh format.

The intersection point (Q) on the convex hull 711 may be found for every point (P) 701 of the point cloud. In some examples, Möller-Trumbore ray-triangle intersection may be used to determine the intersection point Q on the convex hull 711 for each point 701, as the convex hull 711 may be in triangular mesh format. This approach may calculate Q in 3D without having to compute the plane equation of the plane containing the triangle.

If P does not equal Q, then the length (PQ) and its direction (n) may be calculated. A larger PQ means that the point of interest is far from the convex hull 711. This may indicate that a point 701 is a concave point on a concave surface 712 and, thus, more powder may be found at this point 701. Thus, the new extended point 707 may be calculated as E=P+(f+k)*PQ*n, where f is an enlarging factor, and k is a small random value to ensure that with the same f, the powder model 708 generated is unique for more variability. When f=1, the powder model 708 is equivalent to the convex hull 711.

If P=Q, then this means that the point 701 resides on the convex hull and could be a convex point. However, since real objects may have some powder on convex surfaces 713, a small random value was drawn from a single distribution and applied along the normal 703 of P 701. In this case, the new point 706 may be determined based on a constant expansion approach, as described in FIG. 6.

In some examples, a triangular mesh may be reconstructed from the point cloud of new extended points 706, 707. In some examples, the triangular mesh may be generated by using the Poisson surface reconstruction method to obtain the new surface 709 of the simulated powdered model 708.

Figure 8:
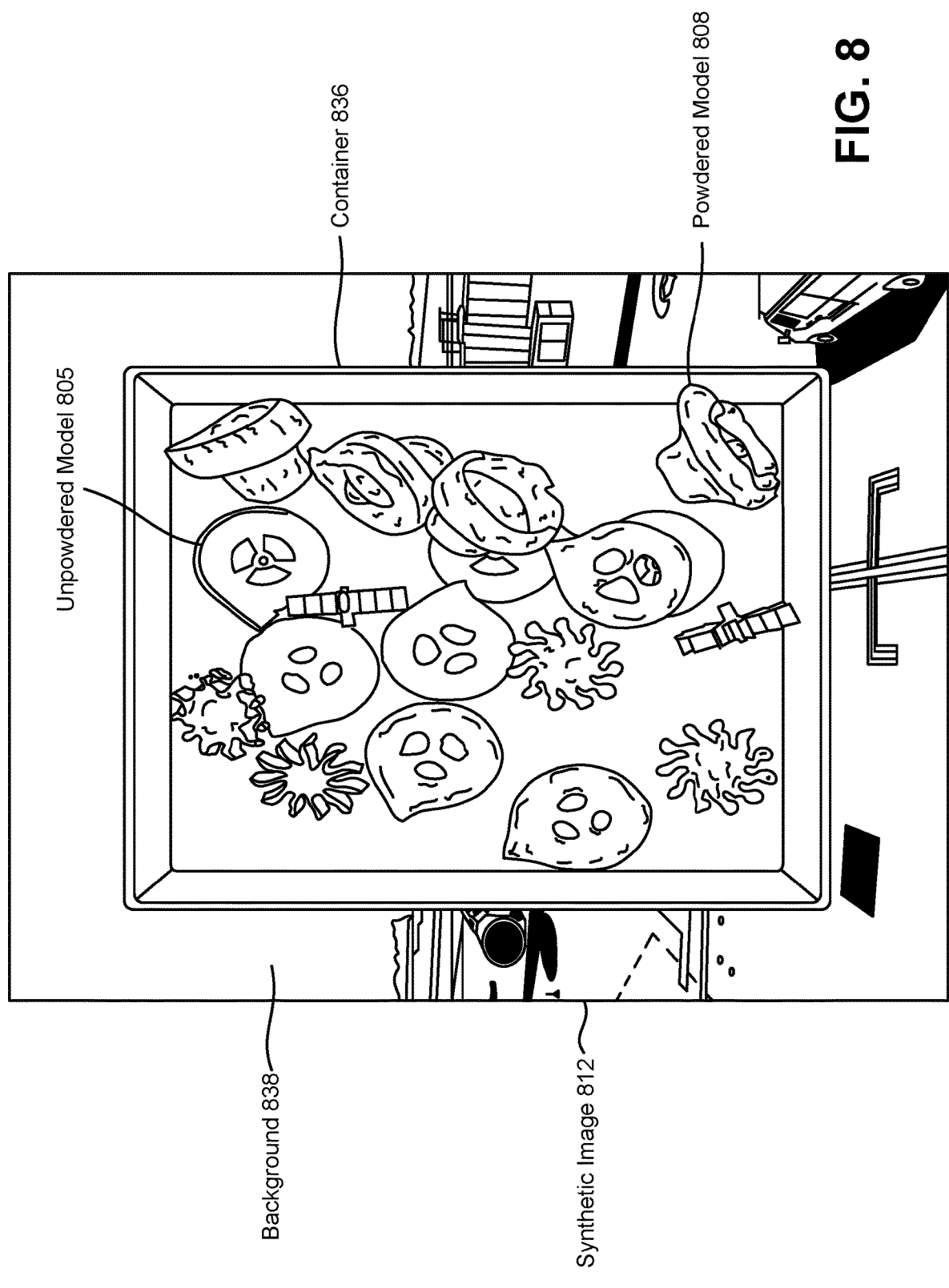
FIG. 8 is an example of a synthetic image generated from simulated powdered models.

FIG. 8 is an example of a synthetic image 812 generated from simulated powdered models 808. In this particular example, a number of simulated powdered models 808 are generated from three different CAD models. This example also includes a number of unpowdered models 805.

The synthetic image 812 includes the simulated powdered models 808 and unpowdered models 805 arranged in a container 836. In some examples, the placement of the simulated powdered models 808 and the unpowdered models 805 may be determined by a physics engine to simulate the simulated powdered models 808 and the unpowdered models 805 falling into the container 836.

To add robustness to a neural network trained with the synthetic image 812, the foreground image of the container 836 with the simulated powdered models 808 and the unpowdered models 805 may be combined (e.g., stitched) with a background 838. In some examples, the background 838 may be a randomly selected image from an image dataset. In this example, the background 838 depicts an airport scene. However, other scenes may be selected for the background 838.

Figure 9:
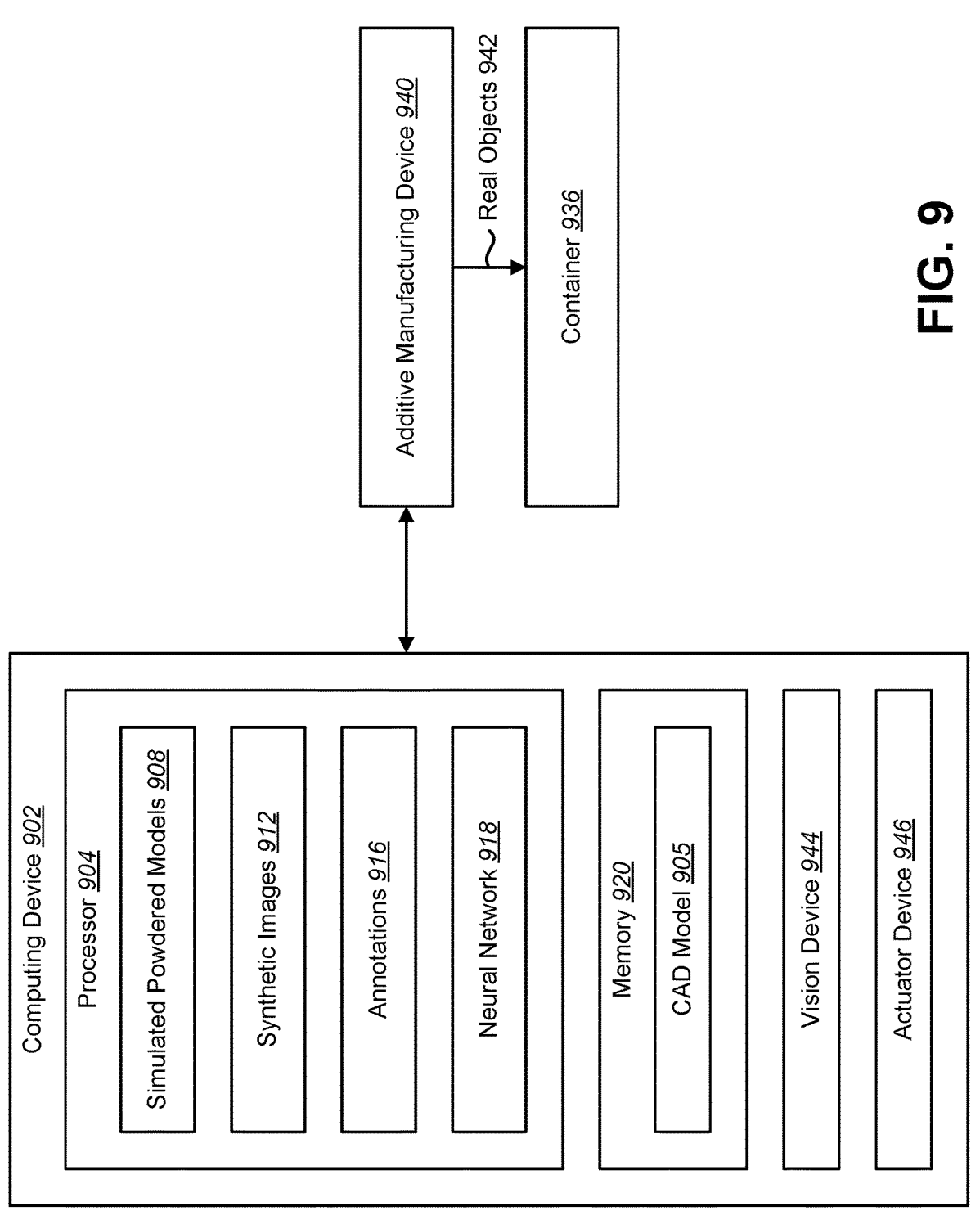
FIG. 9 is a block diagram illustrating an example of a computing device to detect real objects using a trained neural network.

FIG. 9 is a block diagram illustrating an example of a computing device 902 to detect real objects 942 using a trained neural network 918. In some examples, the computing device 902 of FIG. 9 may be implemented according to the computing device 102 described in FIG. 1.

In this example, the computing device 902 may receive a CAD model 905 for real objects 942 that are to be generated by an additive manufacturing device 940. In some examples, the CAD model 905 may be stored in memory 920. In some examples, a user may indicate and/or may provide the CAD model 905 for the real objects 942. In some examples, the CAD model 905 may be for a single type of real object 942. In other examples, the CAD model 905 may include multiple digital models for multiple types of real objects 942 that are to be generated by the additive manufacturing device 940. In some examples, the computing device 902 may receive multiple CAD models 905, where each CAD model 905 includes a digital model for a real object 942.

In some examples, the computing device 902 may communicate with the additive manufacturing device 940. In some examples, the additive manufacturing device 940 may be a 3D printer. For example, a 3D printer may print the real objects 942 in a print bed. In some examples, the additive manufacturing device 940 may be a powder-based 3D printer that prints multiple real objects 942 in a single print run.

Upon receiving the CAD model 905, the processor 904 of the computing device 902 may generate a set of simulated powdered models 908 that simulate application of powder to the CAD model 905, may generate synthetic images 912 of the simulated powdered models 908 placed in a virtual environment, and/or may generate annotations 916 to identify individual simulated powdered models 908 in the synthetic images 912. This may be accomplished as described above. In some examples, a user may provide and/or may indicate the CAD model 905 that is to be used for generating the simulated powdered models 908 and training the neural network 918.

The processor 904 may train a neural network 918 to recognize the real objects 942 based on the synthetic images 912 and the annotations 916 for the synthetic images 912. This may be accomplished as described above. In some examples, generation of the synthetic images 912 and the annotations 916 may occur during manufacturing of the real objects 942 by the additive manufacturing device 940 using the CAD model 905. In some examples, training the neural network 918 using the synthetic images 912 and the annotations 916 may occur during manufacturing of the real objects 942 by the additive manufacturing device 940.

In some examples, the computing device 902 may provide the CAD model 905 to the additive manufacturing device 940. The additive manufacturing device 940 may generate multiple real objects 942 using the CAD model 905. At the end of the additive manufacturing process, the real objects 942 may be located in a container. In some examples, the container 936 may be the print bed of the additive manufacturing device 940. In some examples, the container 936 may be separate from the additive manufacturing device 940. For example, the container 936 may be a bin, floor, table, surface, etc. that holds the real objects 942 after being generated by the additive manufacturing device 940. In some examples, the real objects 942 may be taken from the additive manufacturing device 940 and deposited into the container 936.

In some examples, the computing device 902 may include a vision device 944. In some examples, the vision device 944 may visually sense the real objects 942 in or on the container 936. For example, the vision device 944 may be an optical camera (e.g., a monochrome camera, color camera, infrared camera, ultraviolet camera, x-ray camera, etc.). In some examples, the vision device 944 may be included in the computing device 902. In other examples, the vision device 944 may be separate from the computing device 902, but may communicate (e.g., via a wired or wireless connection) with the computing device 902.

In some examples, upon completion of the additive manufacturing process, the real objects 942 may be placed in the container 936. The vision device 944 may capture an image of the real objects 942 in the container 936. This image of the real objects 942 may be referred to as a real image. The vision device 944 may provide the image of the real objects 942 to the neural network 918. It should be noted that the real objects 942 may be covered in powder due to the additive manufacturing process.

The neural network 918 may recognize the real objects 942 based on the synthetic images 912 and the annotations 916 for the synthetic images 912. For example, because the neural network 918 is trained to recognize simulated powdered models 908 in the synthetic images 912, the neural network 918 may identify the powder-covered real objects 942 in the image provided by the vision device 944. In some examples, the neural network 918 may generate a bounding shape (e.g., a bounding box) for identified real objects 942. The bounding shape may indicate the location of the real objects 942 in relation to the container 936.

In some examples, the additive manufacturing device 940 may use a single CAD model 905 to generate multiple real objects 942 of the same digital model. In other words, the additive manufacturing device 940 may generate multiple copies of the same object. In this case, the neural network 918 may distinguish between the real objects 942 in the container 936 and non-objects (e.g., powder residue, empty space, etc.).

In some examples, the additive manufacturing device 940 may use multiple CAD models 905 (or a single CAD model 905 with multiple different object types) to generate different real objects 942. In other words, the additive manufacturing device 940 may generate different types of objects. In this case, the neural network 918 may distinguish between the real objects 942 based on the type of object. The neural network 918 may also distinguish between the real objects 942 in the container 936 and non-objects (e.g., powder residue, empty space, etc.).

In some examples, the computing device 902 may include an actuator device 946. In some examples, the actuator device 946 may physically interact with the real objects 942. For example, the actuator device 946 may move (e.g., push, pull, blow, adjust, etc.) the real objects 942. In other examples, the actuator device 946 may perform a post-production operation (e.g., cleaning, sorting, binning, etc.) of the real objects 942 produced by the additive manufacturing device 940. In some examples, the actuator device 946 may include a robotic arm that is to manipulate (e.g., move, reorient, etc.) the real objects 942. In some examples, the actuator device 946 may include a piston, belt, pneumatic device, magnet, servo, or other device to physically interact with the real objects 942.

In some examples, the actuator device 946 may be included in or on the computing device 902. In other examples, the actuator device 946 may be separate from the computing device 902, but may communicate (e.g., via a wired or wireless connection) with the computing device 902.

In some examples, the computing device 902 may cause the actuator device 946 to manipulate the real objects 942 based on the object recognition by the neural network 918. For example, the neural network 918 may identify powder-covered real objects 942 in the container 936. The processor 904 may instruct the actuator device 946 to interact with the real objects 942 in response to the location of the real objects 942 identified by the neural network 918. In the case that the actuator device 946 is a robotic arm, the processor 904 may instruct the actuator device 946 to grasp a real object 942 and remove the real object 942 from the container 936. For example, the robotic arm may locate the real object 942 using a bounding box determined by the neural network 918.

In some examples, the processor 904 may instruct the actuator device 946 to interact with the real objects 942 based on the type of object detected by the neural network 918. For example, the processor 904 may instruct the actuator device 946 to perform a first operation on a first type of real object 942. The processor 904 may instruct the actuator device 946 to perform a second operation on a second type of real object 942, and so forth.

In some examples, the computing device 902 may perform multiple iterations of real object detection based on interactions with the real objects 942 by the actuator device 946. For example, the vision device 944 may capture a new image of the container 936 after the actuator device 946 interacts (e.g., moves) with a real object 942. The neural network 918 may then detect the real objects 942 in the new image. The processor 904 may then instruct the actuator device 946 to interact with the real objects 942 based on the new object detection by the neural network 918. In this manner, the computing device 902 may continue interacting with the real objects 942 until the container 936 is emptied, at which point, the neural network 918 may detect that the container 936 is empty and may notify the processor 904 of this condition. The processor 904 may generate an alert (e.g., notify a user) that the container 936 is empty, and/or may suspend further post-processing operations.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operations, functions, aspects, or elements of the examples described herein may be omitted or combined.

The invention claimed is:

1. A method comprising:
generating, by a processor, simulated powdered models that simulate application of powder to a part during additive manufacture of the part in accordance a computer aided design (CAD) model of the part;
generating, by the processor, synthetic images of the part using the simulated powdered models, where in the synthetic images the part is at least partially encapsulated by powder residue; and
training, by the processor, a neural network to recognize objects within images of the objects captured after post-additive manufacture transfer of the objects from a three-dimensional (3D) printing device,
wherein the objects in the images are at least partially encapsulated by the powder residue adhering to and/or accumulating on the objects during additive manufacture,
wherein the neural network is trained based on the synthetic images, and
wherein the trained neural network is subsequently used to recognize an actual object after additive manufacture that is at least partially encapsulated by the powder residue, within a captured image of the actual object.

2. The method of claim 1, wherein generating the simulated powdered models comprises extending vertices of the CAD model to simulate the powder adhering to the part during additive manufacture.

3. The method of claim 1, wherein generating the set of simulated powdered models simulate different amounts of the powder applied to outer surfaces of the part.

4. The method of claim 1, wherein generating the simulated powdered models comprises simulating the powder that accumulates more on concave surfaces than on convex surfaces of the part during additive manufacture.

5. The method of claim 1, further comprising:
additively manufacturing the actual object, using the 3D printing device; and
upon transfer of the actual object after additive manufacture, using the trained neural network to recognize the actual object within the captured image.

6. The method of claim 5, further comprising:
upon recognition of the actual object after additive manufacture, physically interacting with the actual object, by an actuator device.

7. The method of claim 6, wherein the actual object is transferred to a container after additive manufacture,
and wherein the actuator device is to physically interact with the actual object to remove the actual object from the container.

8. A system comprising:
a processor; and
a memory storing instructions executable by the processor to:
generate a simulated powdered models that simulate application of powder to a part during additive manufacture of the part in accordance with a computer aided design (CAD) model of the part;
generate synthetic images of the part using the simulated powdered models, where in the synthetic images the part is at least partially encapsulated by powder residue;
generate annotations identifying the part in the synthetic images; and
train a neural network to recognize real objects within images of the objects captured after post-additive manufacture transfer of the objects from a three-dimensional (3D) printing device,
wherein the objects in the images are at least partially encapsulated by the powder residue adhering to and/or accumulating on the objects during additive manufacture,
wherein the neural network is trained based on the synthetic images and the annotations, and
wherein the trained neural network is subsequently used to recognize an actual object after additive manufacture that is at least partially encapsulated by the powder residue, within a captured image of the actual object.

9. The system of claim 8, wherein the instructions are executable by the processor to generate the synthetic images by:
simulating transfer of the part after post-additive manufacture transfer of the part from 3D printing device, using the simulated powdered models;
rendering images of the part after post-additive manufacture transfer, in accordance with simulation of the transfer; and
stitching backgrounds to the rendered images to generate the synthetic images.

10. The system of claim 8, wherein the instructions are executable by the processor to generate the annotations by:
changing the part in a given synthetic image to a first color;
changing a remainder of the given synthetic image to a second color;
determining a contour of the part; and
associating the contour and a label for the part with the given synthetic image.

11. The system of claim 8, wherein the instructions are executable by the processor to further determine locations of the part in the synthetic images, and wherein the instructions are executable by the processor to generate the annotations based on the locations.

12. The system of claim 8, further comprising:

a vision device to capture the images of the real objects after post-additive manufacture transfer of the objects from the 3D printing device and to use the neural network to recognize the objects in the images.

13. The system of claim 12, further comprising:

an actuator device to physically interact with the objects after post-additive manufacture transfer of the objects from the 3D printing device, based on recognition of the objects within the images using the trained neural network.

14. The system of claim 13, wherein the objects are transferred to a container after additive manufacture, and wherein the actuator device is to physically interact with the objects to remove the objects from the container.

15. A non-transitory computer-readable medium storing instructions that when executed by a processor of a computing device, cause the processor to:

generate simulated powdered models that simulate application of powder to parts during additive manufacture of the parts in accordance with computer aided design (CAD) models of the parts;

generate synthetic images of the parts with and without the powder applied thereto, using the simulated powdered models and the CAD models, where in the synthetic images of the parts with the powder, the parts are at least partially encapsulated by powder residue;

generate annotations identifying the parts in the synthetic images; and train a neural network to recognize objects within images of the objects captured after post-additive manufacture transfer of the objects from a three-dimensional (3D) printing device, wherein the objects in the images are at least partially encapsulated by powder residue adhering to and/or accumulating on the objects during additive manufacture, wherein the neural network is trained based on the synthetic images and the annotations, and wherein the trained neural network is subsequently used to recognize an actual object after additive manufacture that is at least partially encapsulated by the powder residue, within a captured image of the actual object.

16. The non-transitory computer-readable medium of claim 12, wherein the annotations for the synthetic images are automatically generated based on locations of the parts in the synthetic images.

17. The non-transitory computer-readable medium of claim 15, wherein the instructions, when executed by the processor, further cause the processor to:

cause the 3D printing device to additively manufacture the objects.

18. The non-transitory computer-readable medium of claim 17, wherein the instructions, when executed by the processor, further cause the processor to:

upon transfer of the actual object after additive manufacture, recognize the actual object within the captured image, using the trained neural network.

19. The non-transitory computer-readable medium of claim 18, wherein the instructions, when executed by the processor, further cause the processor to:

upon recognition of the actual object after additive manufacture, cause an actuator device to physically interact with the actual object.

* * * * *